United States Patent
Nakakuki

(10) Patent No.: US 7,113,206 B2
(45) Date of Patent: Sep. 26, 2006

(54) IMAGE SIGNAL PROCESSOR

(75) Inventor: Toshio Nakakuki, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 978 days.

(21) Appl. No.: 10/194,708

(22) Filed: Jul. 12, 2002

(65) Prior Publication Data
US 2003/0016295 A1 Jan. 23, 2003

(30) Foreign Application Priority Data
Jul. 18, 2001 (JP) ............................. 2001-218702

(51) Int. Cl.
*H04N 5/228* (2006.01)
(52) U.S. Cl. .................................. 348/222.1
(58) Field of Classification Search ............. 348/222.1, 348/234, 266, 273; 382/260, 275
See application file for complete search history.

(56) References Cited

U.S. PATENT DOCUMENTS

| | | | | |
|---|---|---|---|---|
| 4,591,899 A | * | 5/1986 | Hashimoto | .................. 348/711 |
| 5,508,741 A | * | 4/1996 | Hieda | .......................... 348/252 |
| 6,803,950 B1 | * | 10/2004 | Miyamoto et al. | ....... 348/231.6 |
| 7,009,639 B1 | * | 3/2006 | Une et al. | ................. 348/223.1 |
| 2002/0033887 A1 | * | 3/2002 | Hieda et al. | ................. 348/220 |

FOREIGN PATENT DOCUMENTS

KR 2001-0029750 4/2001

* cited by examiner

*Primary Examiner*—Tuan Ho
*Assistant Examiner*—Timothy J. Henn
(74) *Attorney, Agent, or Firm*—Hogan & Hartson LLP

(57) ABSTRACT

According to the present invention, it is possible to display an image signal with as a high picture quality as would have been obtained with a solid image pick-up device having color filters arrayed in a mosaic pattern. The image signal obtained from the solid image pick-up device with a Bayer array of the three primary colors of R, G, and B is separated by a color separation circuit 4 into R-color, G-color, and B-color signals. These color signals are attenuated by filters 6, 8, 10 respectively at half a horizontal sampling frequency in order to suppress the occurrence of moire noise. The G-color filter circuit 8 has a narrower attenuation band width than that of the R-color filter circuit 6 and the B-color filter circuit 10. These color signals thus filtered are adjusted in level at a white balance circuit 12 and then mixed by addition at a mixer 14, thus generating a luminance signal. By narrowing the attenuation band width of the G-color signal, the resolution can be kept high while suppressing the occurrence of moire noise.

20 Claims, 5 Drawing Sheets

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |

Fig.1 PRIOR ART

IMAGE SIGNAL PROCESSOR

BACKGROUND OF THE INVENTION

1. Field of the Invention

The present invention relates to an image signal processor which generates an image signal based on various color signals obtained by an image pick-up device in which pixels of each color are arrayed in a mosaic pattern.

2. Description of the Related Art

It is possible to obtain a color image through one solid image pick-up device such as a CCD (Charge Coupled device) image sensor by arraying a plurality of colors of color filters in a mosaic pattern over a light reception area of the device. One example of the color filter mosaic array is a Bayer array shown in FIG. 1. This array comprises, for example, filters of three primary colors of red (R), green (G), and blue (B), in which a unitary block consisting of four pixels (2×2) is arranged repeatedly in both row and column directions. Specifically, in each odd-numbered line the G and B colors are arrayed alternately and in each even-numbered line the R and G colors are arrayed alternately, thus giving two G-color pixels and respective one R-color and one B-color pixels in each block.

The image pick-up device gives color signals, that is, image signals each of which corresponds to each color. To display an image, it is necessary to have a luminance signal, that is, an image signal obtained by conducting white-balance compensation on these color signals and then mixing them at a predetermined ratio.

Furthermore, a CCD camera which uses a single CCD image sensor incorporates an optical LPF (Low-Pass Filter) between the CCD image sensor and an image pick-up lens to avoid fold-back distortion caused by sampling. This filter cancels those high-frequency components of an optical image that are made incident upon the CCD image sensor to have at least half a horizontal sampling frequency $f_H$.

If a luminance signal is generated on the basis of color signals obtained by an image pick-up device in which such filters of different colors are arrayed alternately, moire noise occurs in the luminance signal corresponding to an arraying interval of the filters. To cancel the moire noise, the luminance signal must be filtered through a trap filter, which minimizes response at half the horizontal sampling frequency $f_H$.

The conventional technology is effective to suppress moire noise in a luminance signal obtained, for example, when a single-color subject is photographed in a state in which a level balance of the colors is sufficiently adjusted. However, if, for example, the color differs greatly across a boundary line as in a case where a red object exists on a white background, a kind of moire noise called jagged pixellization is liable to occur at the boundary. The jagged pixellization becomes more significant as the attenuation characteristics becomes more steep near $f_H/2$ of the trap filter. Conversely, by moderating the steepness of the trap filter characteristics, that is, by expanding a frequency band width in which the signal is attenuated to thereby suppress response near $f_H/2$, the moire noise can be reduced, including the jagged pixellization. This method, however, has a problem that the resolution of the luminance signal is compromised after it is filtered.

SUMMARY OF THE INVENTION

In view of the above, it is an advantage of the present invention to provide an image signal processor which can give an image signal with a high resolution while suppressing the occurrence of moire noise even at a color boundary.

An image signal processor related to the present invention comprises: a color separation circuit which receives an image signal and distributes it into a plurality of color image signals which correspond to various color components; a plurality of trap filters which are provided in correspondence with the plurality of color image signals respectively and which attenuate the color image signals in a trap frequency band width centered at a frequency which corresponds to a cycle in which pixels are arrayed in the image signal; and a mixer which mixes the color image signals respectively output from the plurality of trap filters at a predetermined ratio, to thereby generate a luminance signal, in which the trap frequency band width is set corresponding to a degree at which each of the color image signals of the color components appear in the image signal.

A preferred aspect of the present invention is an image signal processor, in which the trap frequency band width of the trap filter corresponding to the color component signal having a higher appearance degree is set so as to be narrower than the trap frequency band width of the trap filter corresponding to the color component signal having a lower appearance degree.

Another preferred aspect of the present invention is an image signal processor, in which: in the image signal, a first primary color and a second primary color are arrayed alternately in an even-numbered line and the second primary color and a third primary color are arrayed alternately in an odd-numbered line; and the plurality of trap filters are disposed in correspondence with the first, second, and third primary color pixel signals respectively and the trap filter corresponding to the second primary color has attenuation characteristics in the trap frequency band width narrower than the trap frequency band width of the trap filters which correspond to the first and third primary colors.

A further preferred aspect of the present invention is an image signal processor, in which when reading out the image signal component in the even-numbered line, the color separation circuit interpolates in the column direction the color image signals which correspond to the second and third primary colors and, when reading out the image signal component in the odd-numbered line, interpolates in the column direction the color image signals which correspond to the first and second primary colors, to thereby generate the plurality of color image signals, while each of the trap filters interpolates in the row direction the plurality of color image signals output from the color separation circuit.

A still further preferred aspect of the present invention is an image signal processor, in which: the trap frequency band width of the plurality of trap filters is set centered at half the horizontal sampling frequency which corresponds to the pixel arraying cycle in the image signal.

BRIEF DESCRIPTION OF THE DRAWINGS

FIG. 1 is a schematic diagram showing a Bayer array of color filters;

DESCRIPTION OF THE PREFERRED EMBODIMENTS

The embodiments of the present invention will be described in the following with reference to the drawings.

Figure 2:
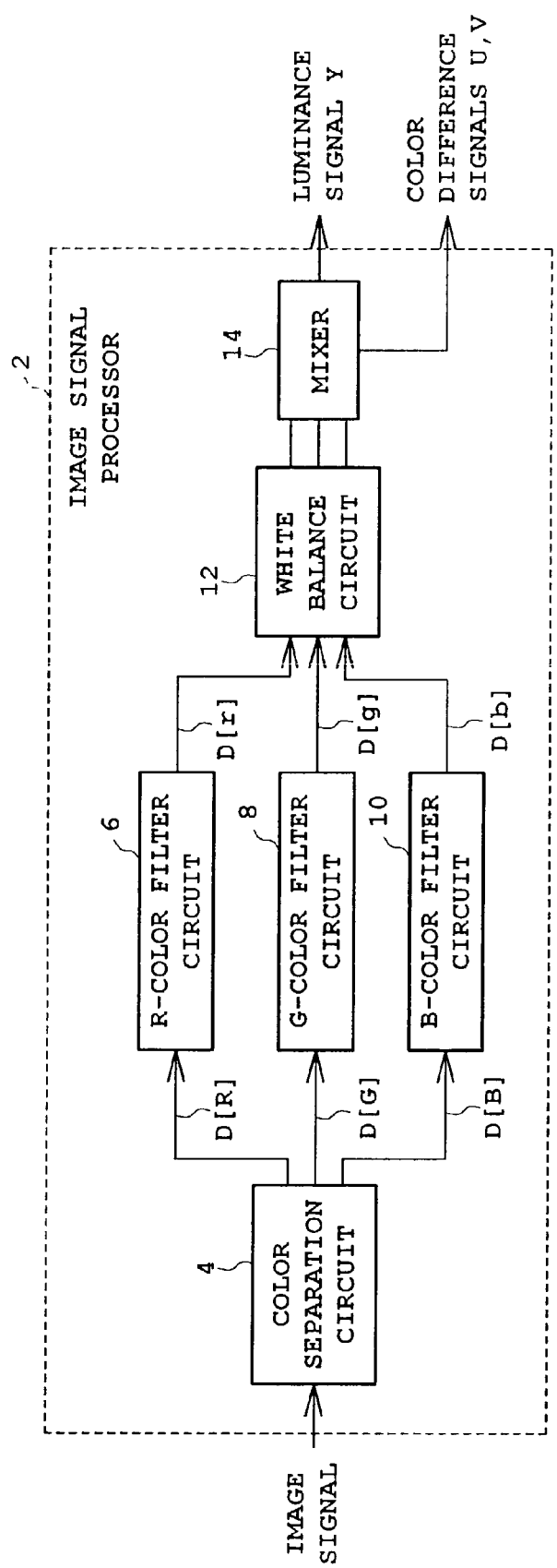
FIG. 2 is a schematic block diagram showing a configuration of an image signal processor according to an embodiment of the present invention.

FIG. 2 is a schematic block diagram showing a configuration of an image signal processor according to an embodiment of the present invention. This image signal processor 2 receives an incoming image signal D from a single CCD camera which employs a Bayer-array CCD image sensor to then generate and output a luminance signal and R-color, G-color, and B-color signals.

The image signal processor 2 comprises a color separation circuit 4, an R-color trap filter circuit 6, a G-color filter circuit 8, and a B-color filter circuit 10, which are filters provided for red, green, and blue respectively, a white balance circuit 12, and a mixer 14 which mixes the R-color, G-color, and B-color signals.

Thus input image signal D is read out from the CCD image sensor for each horizontal line, in which pixel signals obtained by the R-color and G-color pixels or the G-color and B-color pixels appear alternately.

Figure 3:
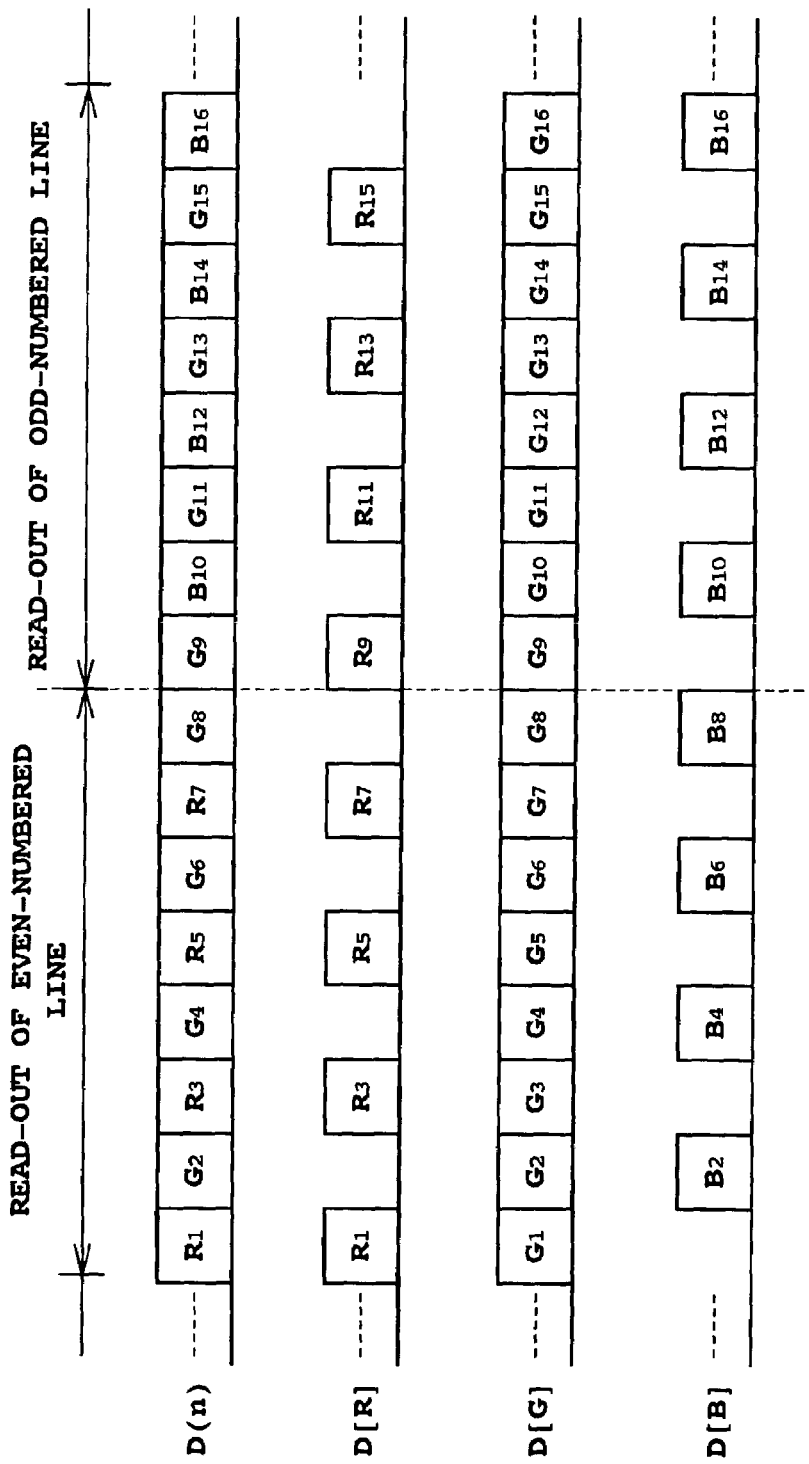
FIG. 3 is a schematic diagram showing a time series of a color signal of each color in each line after vertical interpolation.
Figure 4:
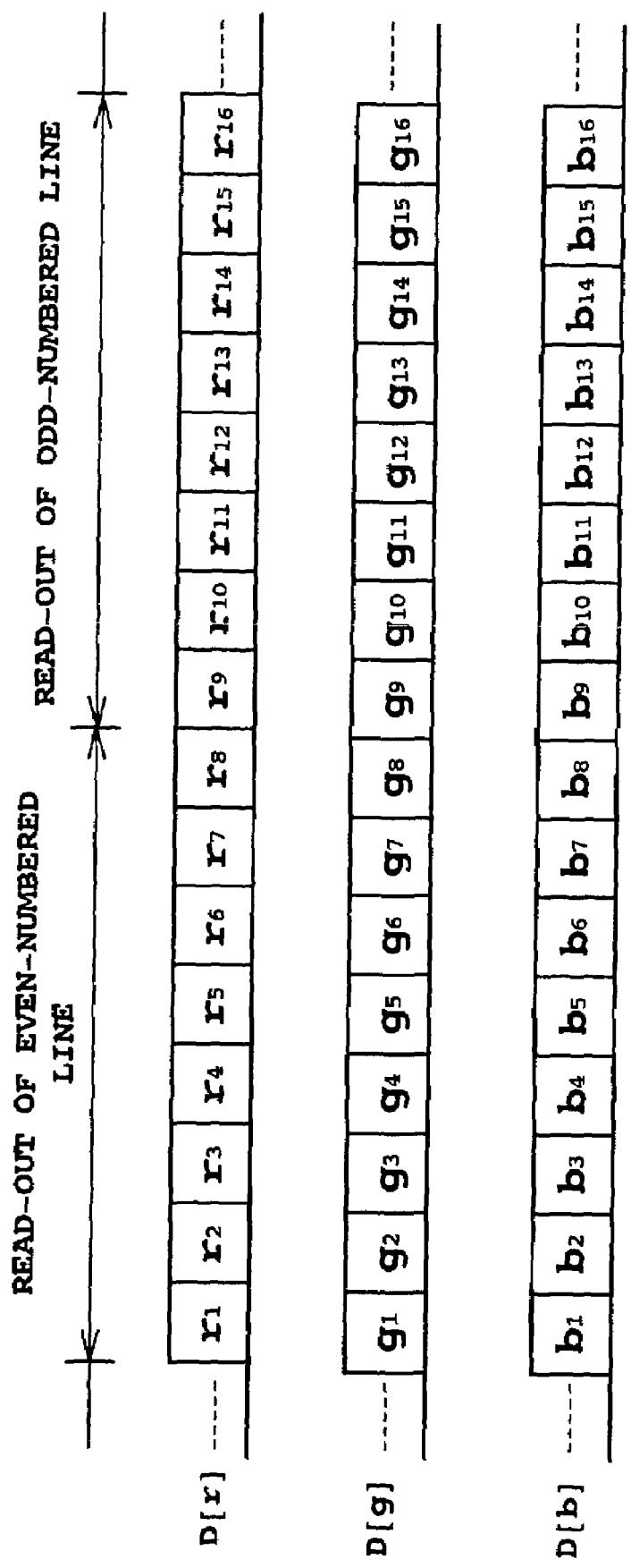
FIG. 4 is schematic diagram showing a times series of the color signal of each color after row directional interpolation is conducted by a filter for each color component.

The color separation circuit 4 distributes this input image signal into color signals D[R], D[G], and D[B] corresponding to red, green, and blue and then outputs them. The color separation circuit 4 incorporates a line memory which holds at least one line of the image signal D and a filter circuit which conducts column-directional interpolation. As shown in FIG. 3, in a read-out operation of an even-numbered line, an image signal D(n) input to the color separation circuit 4 consists of the R-color pixel signal and the G-color pixel signal appearing alternately in series, while in a read-out operation of an odd-numbered line, on the other hand, it consists of the B-color pixel signal and the G-color pixel signal appearing alternately in series. As such, the color separation circuit 4 holds at least one line of the image signal and then conducts vertical interpolation to thereby output the color signals D[R], D[G], and D[B] respectively when each line is read out. That is, when an even-numbered line is being read out, the color signals $D[R_1]$, $D[R_3]$, $D[R_5]$, and $D[R_7]$ and the color signals $D[G_2]$, $D[G_4]$, $D[G_6]$, and $D[G_8]$ are output separately and, at the same time, interpolation is conducted on the basis of the color signals D[G] and D[B] contained in the image signal at least one line earlier to thereby generate and output the color signals $D[B_2]$, $D[B_4]$, $D[B_6]$ and $D[B_8]$ and the color signals $D[G_1]$, $D[G_3]$, $D[G_5]$, and $D[G_7]$. When an odd-numbered line is being read out also, the color signals $D[G_9]$, $D[G_{11}]$, $D[G_{13}]$, and $D[G_{15}]$ and the color signals $D[B_{10}]$, $D[B_{12}]$, $D[B_{14}]$, and $D[B_{16}]$ are output and, at the same time, the color signals $D[R_9]$, $D[R_{11}]$, $D[R_{13}]$, and $D[R_{15}]$ and the color signals $D[G_{10}]$, $D[G_{12}]$, $D[R_{14}]$, and $D[G_{16}]$ are generated and output. Then, the color separation circuit 4 outputs the intermittent color signals D[R] and D[B] and the consecutive signals D[G].

Figure 5:
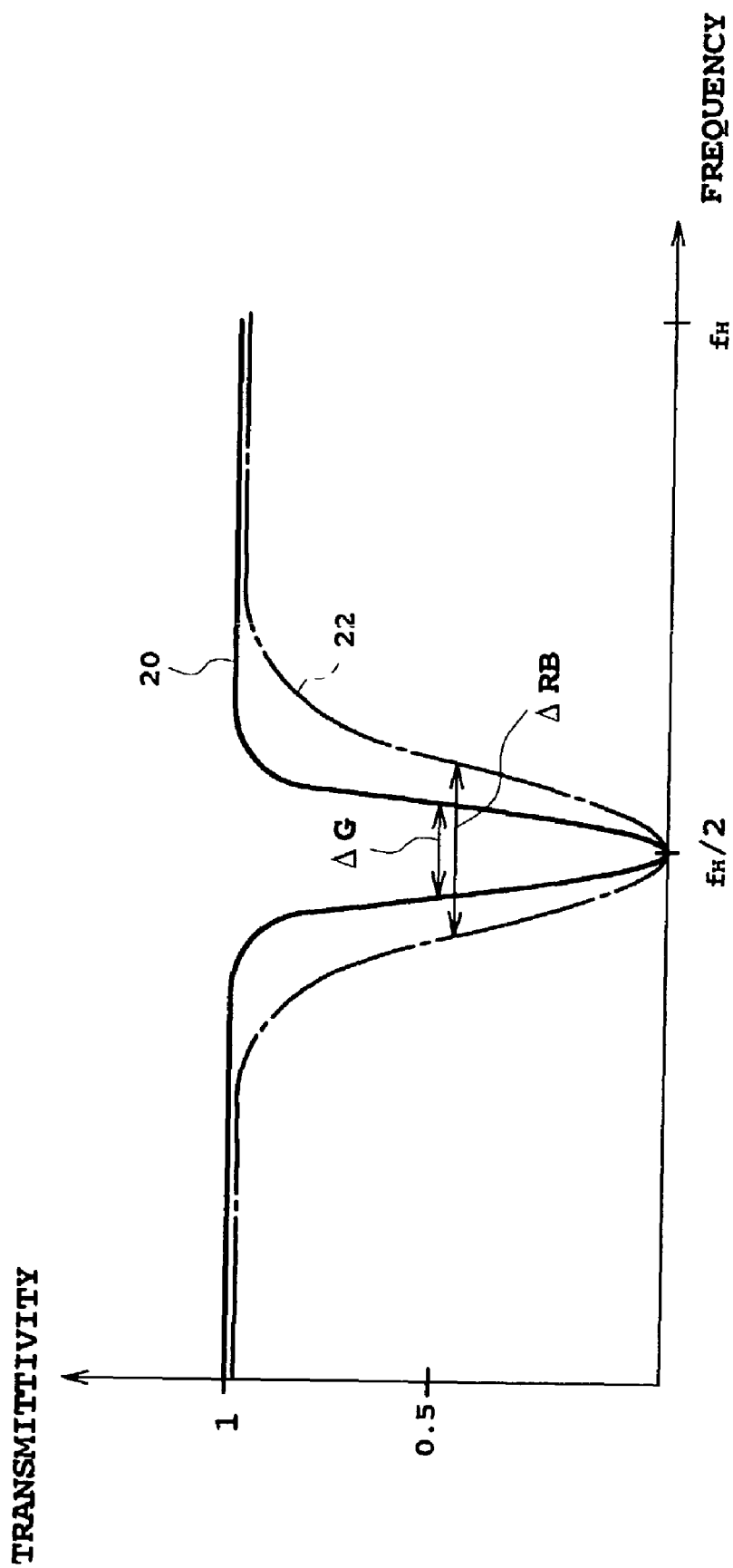
FIG. 5 is a graph showing frequency response indicating transmission characteristics of the filter for each color.

The R-color, G-color, and B-color signals output from the color separation circuit 4 are input to the R-color filter circuit 6, the G-color filter circuit 8, and the B-color filter circuit 10 respectively. Then, these signals are filtered by the respective filter circuits 6, 8, and 10 to undergo row-directional interpolation, thus resulting in the outputting of consecutive color signals $D[r_1]$ through $D[r_{16}]$, $D[g_1]$ through $D[g_{16}]$, and $D[b_1]$ through $D[b_{16}]$ as shown in FIG. 3. FIG. 5 is a graph showing frequency response indicating transmission characteristics of these filter circuits, in which a horizontal axis thereof indicates frequency and a vertical axis thereof indicates transmittivity. Each of the filters has a minimal value at half the frequency $f_H$, in the vicinity of which an output signal is attenuated. A characteristic 20 of the G-color filter circuit 8 is set so as to attenuate more steeply than a characteristics 22 of the R-color filter circuit 6 and the B-color filter circuit 10. That is, the characteristic 20 exhibits attenuation of the signal in a narrow band width centered at half the frequency $f_H$, whereas the characteristic 22 exhibits attenuation of the signal in a relatively wide band width centered at half the frequency $f_H$. For example, if this frequency band width is expressed in a half-width in which the transmittivity is reduced to a half or less, a half-width $\Delta_G$ of the G-color filter-circuit characteristic 20 and a half-width $\Delta_{RB}$ of the R-color filter circuit and B-color filter circuit characteristic 22 have a relationship of $\Delta_G < \Delta_{RB}$.

That is, the trapping frequency band width $\Delta_G$ of the G-color filter circuit 8 which attenuates the G-color component signal appearing more frequently in an image signal is set so as to be smaller than the trapping frequency band width $\Delta_{RB}$ of the R-color filter circuit and the B-color filter circuit 10 which attenuate the R-color and B-color signals respectively appearing less frequently. With this setting, the color signal D[g] has such a setting as to increase a resolution of a reproduced image, while the color signals D[r] and D[b] have such a setting that moire noise at a color boundary may be suitably suppressed.

The R-color, G-color, and B-color signals output from the R-color filter circuit 6, the G-color filter circuit 8, and the B-color filter circuit 10 respectively are input to the white balance circuit 12.

The white balance circuit 12 multiplies the R-color signal D[r], the G-color signal D[g], and the B-color D[b] by their respective inherent gain coefficients to adjust balance, thus improving color reproducibility in a reproduced image. That is, the white balance circuit 12 prevents the color of a subject from being reproduced improperly in the reproduced image owing to an illumination condition of the subject and a difference in spectral transmittance characteristics of the color filters of the various colors. Generally, in white balance controlling, feed-back control is conducted on each screen or a few screens so that integrated values of the color signals D[r], D[g], and D[b] may be converged to a predetermined value.

Based on the color signals D[r], D[g], and D[b] output from the white balance 12, the synthesizer circuit 14 generates a luminance signal Y and color difference signals U and V. That is, since a ratio at which the human eye recognizes brightness visually on a reproduction screen is 3:6:1 for the three primary colors of R, G, and B colors, the mixer 14 mixes the color signals into the luminance signal Y. Then, it subtracts the B-color signal D[b] from this luminance signal Y to generate the color difference signal U and subtracts the R-color signal D[r] from it to generate the color difference signal V. Note here that the color signals D[r], D[g], and D[b] output from the white balance circuit 12 may be output separately instead of being supplied to the synthesizer circuit 14.

The Y signal and the R-color, G-color, and B-color signals output from the image signal processor 12 are used to display an image. The above-mentioned value $\Delta_G$ is set to a small value so that an image may be displayed with a high resolution, while the value $\Delta_{RB}$ is set to a large value so that moire noise may be suppressed at the color boundary.

It is thus possible, with the image signal processor of the present invention, to obtain an image signal with a high resolution while suppressing moire noise from occurring even at a color boundary.

What is claimed is:

1. An image signal processor comprising:
   a color separation circuit for receiving an image signal and for distributing the image signal into signals of color components to generate a plurality of color image signals;
   a plurality of trap filters correspondingly provided for the plurality of color image signals respectively, for attenuating the color image signals in a trap frequency band width centered at a frequency which corresponds to a cycle at which pixels are arrayed; and
   a mixer for mixing the color image signals output from the plurality of trap filters at a predetermined ratio to thereby generate a luminance signal,
   wherein the trap frequency band width is set in correspondence to a degree at which each of the color component signals appear in the image signal.

2. The image signal processor according to claim 1, wherein the trap frequency band width of the trap filter corresponding to the color component signal having the higher appearance degree is set so as to be narrower than the trap frequency band width of the trap filter corresponding to the color component signal having the lower appearance degree.

3. The image signal processor according to claim 1, wherein the trap frequency band width of the plurality of trap filters is centered at half a horizontal sampling frequency corresponding to the cycle at which the pixels are arrayed in the image signal.

4. The image signal processor according to claim 1, wherein:
   in the image signal, a first primary color and a second primary color are arrayed alternately in an even-numbered line, while the second primary color and third primary color are arrayed alternately in an odd-numbered line;
   the plurality of trap filters are disposed corresponding to the color image signals of the first, second, and third primary colors; and
   the trap filter corresponding to the second primary color has attenuation characteristics in the trap frequency bend width narrower than the trap frequency band width of the trap filters corresponding to the first and third colors.

5. The image signal processor according to claim 4, wherein the trap frequency band width of the plurality of trap filters is centered at half the horizontal sampling frequency corresponding to the cycle at which the pixels are arrayed in the image signal.

6. The image signal processor according to claim 4 wherein:
   the color separation circuit interpolates the color image signals corresponding to the second and third primary color components in a column direction when reading out the even-numbered line of the image signal and, when reading out the odd-numbered line of the image signal, interpolates the color image signals corresponding to the first and second primary colors in the column direction, thus generating the plurality of color image signals; and
   the trap filters each interpolate in a row direction the plurality of color image signals output from the color separation circuit.

7. The image signal processor according to claim 1, wherein the image signal processor receives the image signal from a charge-coupled device.

8. The image signal processor according to claim 7, wherein the charge-coupled device uses a Bayer-array charge-coupled device image sensor.

9. The image signal processor according to claim 1, further comprising a balancing circuit for improving color reproducibility.

10. The image signal processor according to claim 1, wherein the color separation circuit includes a line memory holding at least one line of the image signal and a filter circuit that conducts column-directional interpolation.

11. The image signal processor according to claim 1, wherein the color separation circuit holds at least one line of the image signal and then conducts vertical interpolation to output the color image signals.

12. An image signal processor comprising:
    means for receiving an image signal and for distributing the image signal into signals of color components to generate a plurality of color image signals;
    a plurality of trap filters correspondingly provided for the plurality of color image signals respectively, for attenuating the color image signals in a trap frequency band width centered at a frequency which corresponds to a cycle at which pixels are arrayed; and
    means for mixing the color image signals output from the plurality of trap filters at a predetermined ratio to thereby generate a luminance signal,
    wherein the trap frequency band width is set in correspondence to a degree at which each of the color component signals appear in the image signal.

13. The image signal processor according to claim 2, wherein the trap frequency band width of the trap filter corresponding to the color component signal having the higher appearance degree is set so as to be narrower than the trap frequency band width of the trap filter corresponding to the color component signal having the lower appearance degree.

14. The image signal processor according to claim 12, wherein the trap frequency band width of the plurality of trap filters is centered at half a horizontal sampling frequency corresponding to the cycle at which the pixels are arrayed in the image signal.

15. The image signal processor according to claim 12, wherein:
    in the image signal, a first primary color and a second primary color are arrayed alternately in an even-numbered line, while the second primary color and third primary color are arrayed alternately in an odd-numbered line;
    the plurality of trap filters are disposed corresponding to the color image signals of the first, second, and third primary colors; and
    the trap filter corresponding to the second primary color has attenuation characteristics in the trap frequency bend width narrower than the trap frequency band width of the trap filters corresponding to the first and third colors.

16. The image signal processor according to claim 15, wherein the trap frequency band width of the plurality of trap filters is centered at half the horizontal sampling frequency corresponding to the cycle at which the pixels are arrayed in the image signal.

17. The image signal processor according to claim 15 wherein:
    the means for receiving and distributing interpolates the color image signals corresponding to the second and third primary color components in a column direction when reading out the even-numbered line of the image signal and, when reading out the odd-numbered line of the image signal, interpolates the color image signals, corresponding to the first and second primary colors in the column direction, thus generating the plurality of color image signals; and
    the trap filters each interpolate in a row direction the plurality of color image signals output from the color separation circuit.

18. The image signal processor according to claim 12 further comprising a means for improving color reproducibility.

19. The image signal processor according to claim 12, wherein the means for receiving and distributing includes a line memory holding at least one line of the image signal and a filter circuit that conducts column-directional interpolation.

20. A method for generating a luminance signal comprising:
    receiving an image signal and for distributing the image signal into signals of color components to generate a plurality of color image signals;
    attenuating the color image signals in a trap frequency band width centered at a frequency which corresponds to a cycle at which the pixels are arrayed; and
    mixing the color image signals output from a plurality of trap filters at a predetermined ratio to thereby generate a luminance signal,
    wherein the trap frequency band width is set in correspondence to a degree at which each of the color component signals appear in the image signal.

* * * * *